United States Patent
Slowe et al.

(10) Patent No.: US 6,928,087 B2
(45) Date of Patent: Aug. 9, 2005

(54) METHOD AND APPARATUS FOR AUTOMATIC CROSS-MEDIA SELECTION AND SCALING

(75) Inventors: Thomas E. Slowe, Stockholm (SE); Bogumil Hausman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 897 days.

(21) Appl. No.: 09/768,602

(22) Filed: Jan. 25, 2001

(65) Prior Publication Data

US 2001/0038638 A1 Nov. 8, 2001

Related U.S. Application Data

(60) Provisional application No. 60/181,573, filed on Feb. 10, 2000.

(51) Int. Cl.⁷ .................................................. H04J 3/18
(52) U.S. Cl. ....................................... 370/477; 370/487
(58) Field of Search ................................. 370/261, 437, 370/465, 468, 477, 487

(56) References Cited

U.S. PATENT DOCUMENTS

| | | | |
|---|---|---|---|
| 5,347,306 A | 9/1994 | Nitta | |
| 5,572,582 A | 11/1996 | Riddle | |
| 5,613,056 A | 3/1997 | Gasper et al. | |
| 5,621,894 A | 4/1997 | Menezes et al. | |
| 5,719,854 A | 2/1998 | Choudhury et al. | |
| 5,727,159 A | 3/1998 | Kikinis | |
| 5,736,982 A | 4/1998 | Suzuki et al. | |
| 5,758,194 A | 5/1998 | Kuzma | |
| 5,802,296 A | 9/1998 | Morse et al. | |
| 5,826,031 A | 10/1998 | Nielsen | |
| 5,880,731 A | 3/1999 | Liles et al. | |
| 5,884,029 A | 3/1999 | Brush, II et al. | |
| 5,896,510 A | 4/1999 | Kanayama | |
| 5,907,328 A | 5/1999 | Brush II et al. | |
| 5,923,330 A | 7/1999 | Tarlton et al. | |
| 5,956,038 A | 9/1999 | Rekimoto | |
| 5,977,968 A | 11/1999 | Le Blanc | |
| 6,009,460 A | 12/1999 | Ohno et al. | |
| 6,024,643 A | 2/2000 | Begis | |
| 6,160,639 A * | 12/2000 | Lutgen et al. | ............... 358/442 |
| 6,611,358 B1 * | 8/2003 | Narayanaswamy | .......... 358/442 |
| 6,775,405 B1 * | 8/2004 | Zhu | ............................ 382/154 |

FOREIGN PATENT DOCUMENTS

EP    0 725 341    8/1996

OTHER PUBLICATIONS

Fiederer W. et al., "Dienstgute–Management Im Systemkonzept Cinema", IT+TI Informationstechnick und Technische Informatik, Oldenbourg Verlag, Munchen, De, vol. 39, No. 4, Aug. 1, 1997, pp 26–31, including translation of p. 29, left–hand column, line 45—p. 30 middle column, line 31.

(Continued)

*Primary Examiner*—Kenneth Vanderpuye
*Assistant Examiner*—Rhonda Murphy

(57) ABSTRACT

A method and apparatus is described wherein users distribute communication objects and multimedia applications over a network communication system. The capabilities of the users terminals are established. A control system analyzes the capabilities of the terminals to establish a state in which the terminals will appear. Heuristics are used to establish a channel mode in corresponding terminals, the channel mode optimizes communications associated with the multimedia application between the terminals.

4 Claims, 3 Drawing Sheets

OTHER PUBLICATIONS

Papoulis, Athanasios, Probability, Random Variables and Stochastic Processes, McGraw–hill Book Company.

Bjork, Niklas et al., "Transcoder Architectures for Video Coding", IEEE Transactions on Consumer Electronics, vol. 44, No. 1, Feb. 1998, pp. 88–98.

Bove, Jr., V.M., "Multimedia based on object models: Some whys and hows"; IBM Systems Journal, vol. 35, Nos. 3&4, 1996, pp. 337–348.

Bove, Jr. V. Michael, "Object–Oriented Television", SMPTE Journal, Dec. 1995, pp. 803–807.

Shannon, C.E., "A Mathematical Theory of Communication", The Bell System Technical Journal, vol. XXVII, No. 3, Jul. 1948, pp. 379–423.

"Scalable Media Delivers the Full Power of the Internet," Intel Corporation, 1998.

* cited by examiner

METHOD AND APPARATUS FOR AUTOMATIC CROSS-MEDIA SELECTION AND SCALING

This application claims priority under 35 U.S.C. §119(e) to U.S. Provisional Application No. 60/181,573 filed on Feb. 10, 2000.

BACKGROUND

The present invention relates to multimedia and computer graphics processing. More specifically, the present invention relates to the delivery and distributed scaling of data representing diverse media content.

As access to data networks, such as the Internet, continues to increase there is also an increased demand for the exchange of diverse multimedia content, e.g., video, audio, text, and images. Since data networks and data networking protocols were originally designed when processing power and bandwidth was relatively expensive by today's standards, these data networks and data networking protocols were designed solely for the exchange of text information. In recent years, as processing power and bandwidth has become less expensive, there has become an increased desire to exchange multimedia content which is "computationally expensive", e.g., real-time and non-real-time digital video, real-time and non-real-time digital video coupled with synchronized audio, interactive video games and teleconferencing. However, not every user of a data communication network has equal processing power and bandwidth. To address this disparity in processing power and bandwidth, methods for scaling the multimedia data have been introduced. For example, multimedia data which in its original form would require a large amount of processing power and a large amount of bandwidth is scaled down into a format which is compatible with the processing power and bandwidth of the intended receiver of the multimedia content.

Scalability of online content is addressed by the Internet Media Initiative (IMI) established by Intel Architecture Labs. In accordance with IMI, scalable media components and applications rely on a computer processor's power to provide the highest fidelity reproduction of the original multimedia content. Accordingly, scalable content is adapted to the receiving platform's capabilities and connection bandwidth capacity. In accordance with the computer's processing power, the computer will play a scalable component at the highest level of computation that it supports. This is referred to by IMI as scalable media. There are many deficiencies with the scalable media technology in accordance with IMI. For example, IMI is directed to the scalability of already created static content, e.g., a web page or a 3D computer game, and hence, does not address scalability problems encountered in real-time communication systems. Further, IMI is directed solely to computers which operate on "PC" platforms.

Scalability of multimedia data has also been addressed by various media compression standards, e.g., MPEG-2, MPEG-4, H.323 and H.324. FIG. 1 illustrates scaling of multimedia content in accordance with conventional media compression standards. As illustrated in FIG. 1, these compression standards use the original multimedia content to generate a base layer and one or more enhancement layers. The base layer contains the minimum amount of information required to understand the multimedia content, while the enhancement layer provides information which can be used to enhanced the reproduction of the information in the base layer. Accordingly, a computer with a large processing capacity can reproduce the multimedia content using the base layer stream and one or more of the enhancement layer streams, while a computer with low processing capacity may reproduce the multimedia content using only the base layer information. These compression standards also support the ability to negotiate between different clients the amount of compression used on the multimedia content exchanged between the clients. However, these compression schemes generally scale the multimedia data down to the lowest common denominator, i.e., the quality used by all parties is based on the processing power of the slowest computer. One of the deficiencies of scalable video coding is the increased computational complexity required of the client producing the scalable video information. This is due to the fact that the client must produce as many layers as different preferences and clients exist in the network. Conventionally, a limited number of layers are generated which may cause problems in multi-party video conferencing applications.

Another method for scaling multimedia data is known as transcoding. Transcoding uses a transcoder to convert one type of compressed signal format into another type of compressed signal format. Accordingly, a transcoder can be used to scale multimedia down to a particular client's processing power and bandwidth in accordance with user preferences and client capabilities. However, video transcoding increases the complexity and delays in the network. The additional computational complexity and delays is a great disadvantage for real-time communication applications.

Known multimedia scaling methods may result in wasted bandwidth and processing power due to a lack of consideration of the ability of an end user to understand the received multimedia content. For example, although video information may provide a great amount of understanding of the content therein to a user with a computer, a user of a mobile phone which does not have the ability to process a video would have no understanding of the content therein. Accordingly, conventional scalable multimedia systems will transmit information which may not be able to be understood by an end user which results in wasted bandwidth.

Accordingly, it would be desirable to provide a multimedia scaling system which does not suffer from the deficiencies of known multimedia scaling systems.

Further, it would be desirable to provide a multimedia scaling system which does not limit all parties to a communication session to the capabilities of the slowest party.

In addition, it would be desirable to provide the proper combinations of media to an end user which provides the best understanding of the content therein based upon end user preferences and client device capabilities.

SUMMARY OF THE INVENTION

Thus to address various needs in the art, a method and apparatus may be described for providing real-time scalability between two or more users. In accordance with the present invention communication heuristics are used to determine a channel mode for each user in a communication session.

In accordance with one embodiment of the present invention, the ability of a first and second terminal to reproduce information in a plurality of media formats is determined. A list of media formats which can be reproduced by the first and second terminals is produced. A first channel mode for the first terminal to communicate information to the second terminal using the list of media formats, the performance of the first terminal and the bandwidth of the first terminal's connection to the second terminal is established. A second channel mode for the second terminal to communicate information to the first terminal using the list of media formats, the performance of the second terminal and the bandwidth of the second terminal's connection to the first terminal is established. Next the first and second terminals communicate in accordance with their respective channel modes.

BRIEF DESCRIPTION OF THE DRAWINGS

The objects and advantages of the invention will be understood by reading the following detailed description in conjunction with the drawings, in which.

DETAILED DESCRIPTION

Figure 1:
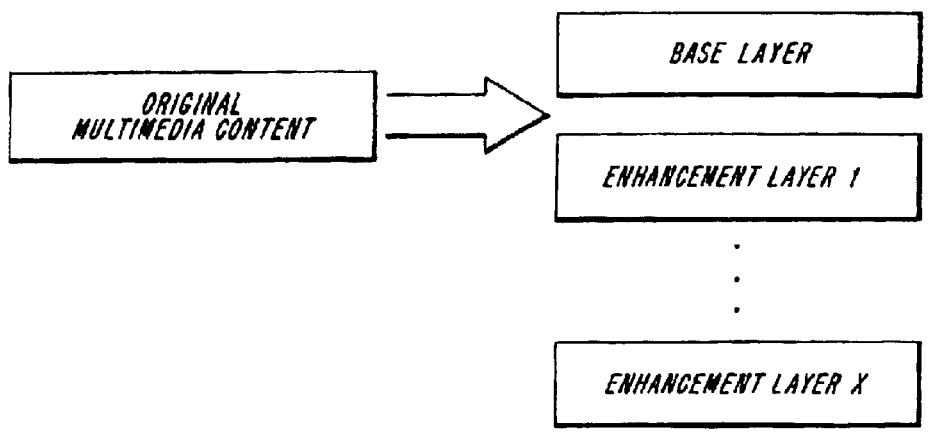
FIG. 1 illustrates scalability of multimedia content in accordance with conventional media compression standards.

The various features of the invention will now be described with reference to the figures, in which like parts are identified with the same reference characters.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

In order to provide a thorough understanding of the present invention, the present invention will be described below in connection with object-oriented programming concepts. The description of the present invention in connection with object-oriented programming concepts is intended to be merely illustrative and is not meant to limit the present invention in any manner. In traditional object-oriented programming, a particular object has a state, a behavior, and an identity. The state of an object is generally considered to be the condition of the object, or a set of circumstances describing the object. A behavior can be considered as how an object acts and reacts in terms of its state changes. The identity of an object is a given value that identifies the particular object. It should be noted that the present invention takes advantage of the distributed object paradigm which allows objects to be distributed across a heterogenous network, and allows each of the components to inter-operate as a unified whole.

In accordance with the present invention, the state of a user is the total amount of information sent to other users. The state of the user (object) can be comprised of images, personal information, 3D graphics models, position information in 3D space, and live video and audio. The behavior of a user (object) includes both low level functions and high level functions. Low level functions include the ability to send various types of multimedia content to other clients. High level functions relate to an end user's ability to understand the information and can include computer vision face analysis algorithms and other measurement tools which are used for measuring an end user's ability to understand the multimedia content. The identity of an object consists of a user's name and terminal identification, e.g., in Internet Protocol the terminal identification can be the IP address of the terminal, while for a mobile phone, the terminal identification information can be a phone number of the mobile phone. Through the exchange of state, behavior and identity information two or more users (objects) can individually negotiate the type and amount of multimedia content to be communicated to a particular user which provides the best understanding of the content of the multimedia data.

Figure 2:
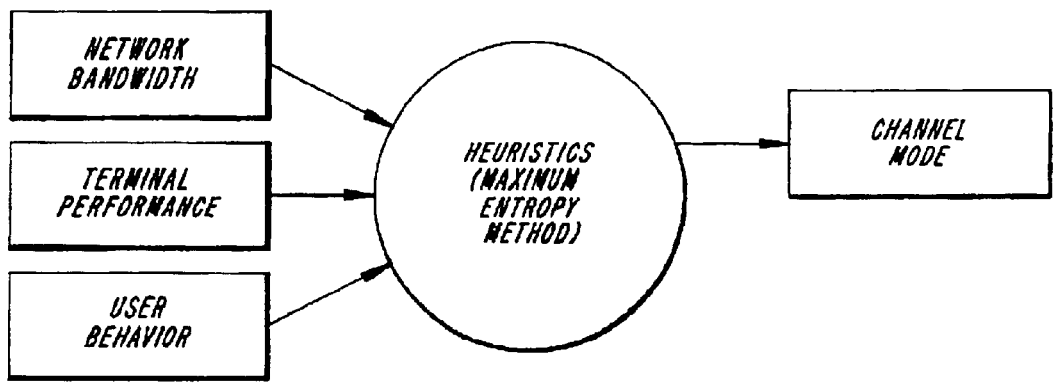
FIG. 2 illustrates the determination of a channel mode in accordance with exemplary embodiments of the present invention.

To provide the best use of bandwidth given the concepts that one wishes to communicate, the present invention uses a set of communication heuristics that will produce the optimal state to be presented to the receiving user given a set of behaviors supported by the transmitting user. It should be noted that the heuristics are also constrained by the receiving user's ability to realize the transmitted state, i.e., the receiving user's ability to reproduce the appropriate format of the multimedia content. FIG. 2 illustrates the factors used to establish the channel mode in accordance with exemplary embodiments of the present invention. As illustrated in FIG. 2, the present invention uses communication heuristics which account for network bandwidth, terminal performance, and user behavior to establish a channel mode for communication of the multimedia content to a user terminal.

As will be described in more detail below, the present invention employs the Maximum Entropy Method as the communication heuristic. Since communication channels are typically bidirectional, the present invention advantageously employs two different channel modes, one for each user. Accordingly, each user can be provided with the type of multimedia content needed for understanding the content therein regardless of the reproduction abilities of the other user's terminal, i.e., the present invention is not limited by the lowest common denominator between the two terminals. A user with a terminal with high processing power and a high bandwidth connection which is communicating with a terminal with a lower processing power and lower bandwidth, can receive a "richer" state of the other user, i.e., more multimedia content can be provided to this user. On the other hand, the user with the lower processing power and lower bandwidth connection will receive less multimedia content.

In accordance with the present invention, the Maximum Entropy Method is used to select an optimal behavior from the list of media and media formats combinations. The formats can be e.g. given MPEG video rate, or size and compression rate of an JPEG image. First, each media format's entropy is calculated. For each different combination, the entropies of its components must be added to produce its total entropy value. The combination with the largest associated total entropy value is chosen as the optimal behavior.

In accordance with the present invention, entropy which conventionally is an indication of the amount of information transferred, is used to indicate the level of understanding of an end user. To determine how to efficiently produce modes of communication with various levels of detail, the Maximum Entropy Method is employed by the present invention.

In general, the Maximum Entropy Method can be represented by the following formula:

$$H = -\sum_{i=0}^{n} P_i \log P_i \quad (1)$$

wherein $P_1$ is the probability of receiving the ith piece of information in a set of n pieces of information. Accordingly, entropy, H, is the amount of bits, provided log base 2 is employed, necessary to represent a given piece of information in a system. It will be recognized that the equation above results in a maximum H provided that H is 0 when there exists an i such that $P_1$ is equal to 1.

To account for the real-time delivery of multimedia content, time should be considered in the determination of entropy. The following formula provides a Maximum Entropy Method which accounts for time:

$$H' = -m\sum_{i=0}^{n} P_i \log P_i \quad (2)$$

wherein m is the rate at which the symbols are sent across the channel.

Accordingly, the calculation of total entropy can be determined provided that there is an approximation of the probability distribution for the set of symbols or pieces of information to be transmitted. This distribution can be easily achieved by assuming that each probability of a symbol in a set of symbols is the same as every other, or more accurately by taking examples of each type of media and measuring the relative occurrence of the symbols present. These examples can be acquired in real-time or off-line depending upon the requirements of a particular application. Once each media's entropy per second has been calculated, they are summed to provide an estimate for the amount of entropy for the given media combination. For example, the following formula illustrates an estimate for the amount of entropy for a media combination of video, audio and 3-dimensional models.

$$H'_{Total} = H'_{Video} + H'_{Audio} + H'_{3D\_Model} \quad (3)$$

Figure 3:
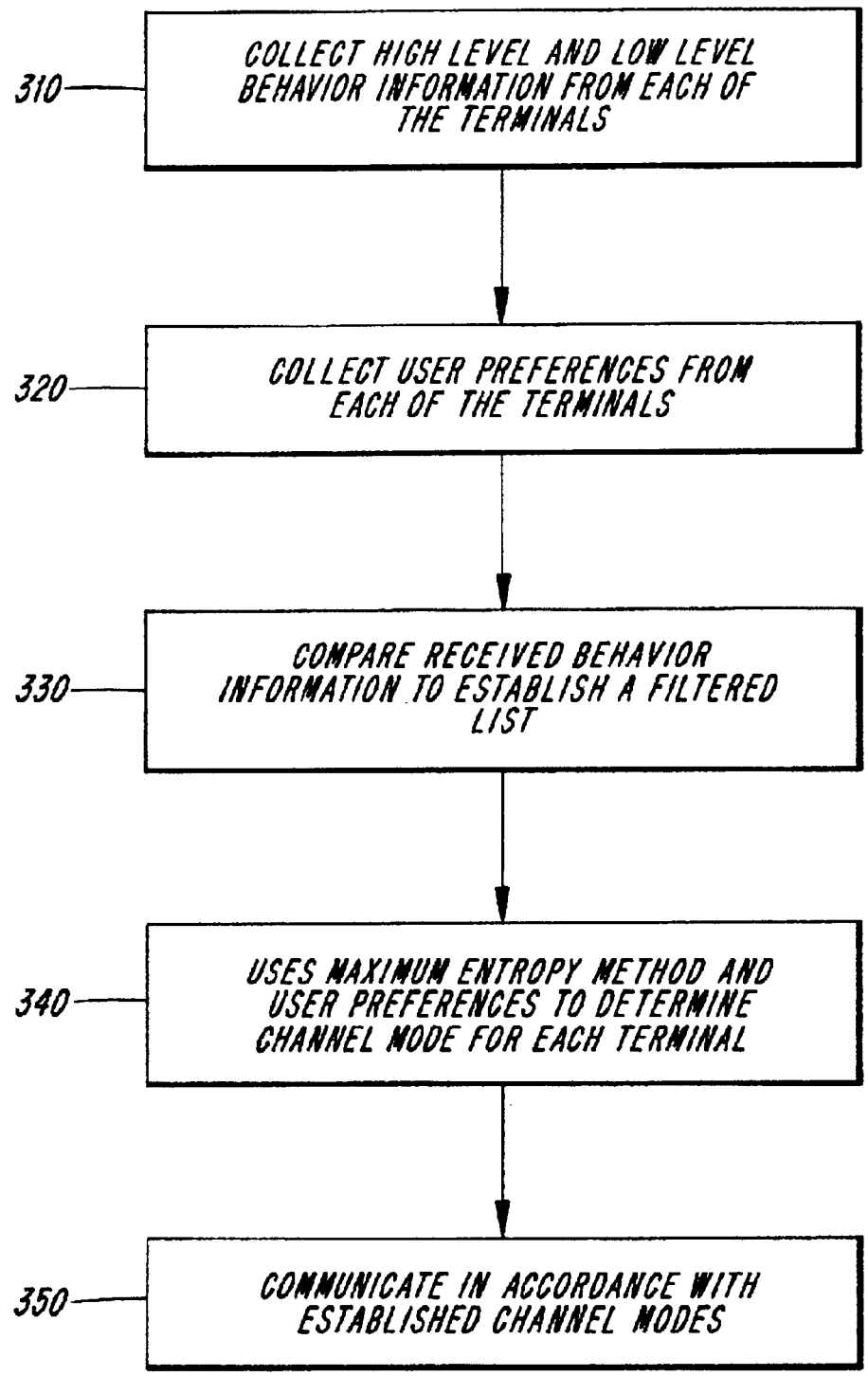
FIG. 3 illustrates an exemplary method for establishing a channel mode in accordance with exemplary embodiments of the present invention.

FIG. 3 illustrates an exemplary method for implementing the present invention. When a communication session is initially established high level and low level behavior information of terminals participating in the communication session are collected (step 310). Next information regarding user preferences of each of the terminals is collected (step 320). The behavior information received from each of the terminals are compared to determine the behaviors common between all participating terminals to establish a filtered list of behaviors (step 330). Using the filtered list of behaviors and respective user preferences the maximum entropy method is employed to determine the optimal object behavior (channel mode) for each terminal (step 340). Each participating terminal then communicates multimedia content in accordance with the established channel modes (step 350).

It will be recognized that the description of the collection of high level and low level behaviors and the collection of user preferences in the method described above was broken into separate steps for ease of explanation. However, it will be recognized that these two steps can be combined into a single step. Further, the collection of information and establishment of channel modes for each of the terminals can be performed in a central network location such as a server or gateway, or it can be performed in each terminal.

Figure 4:
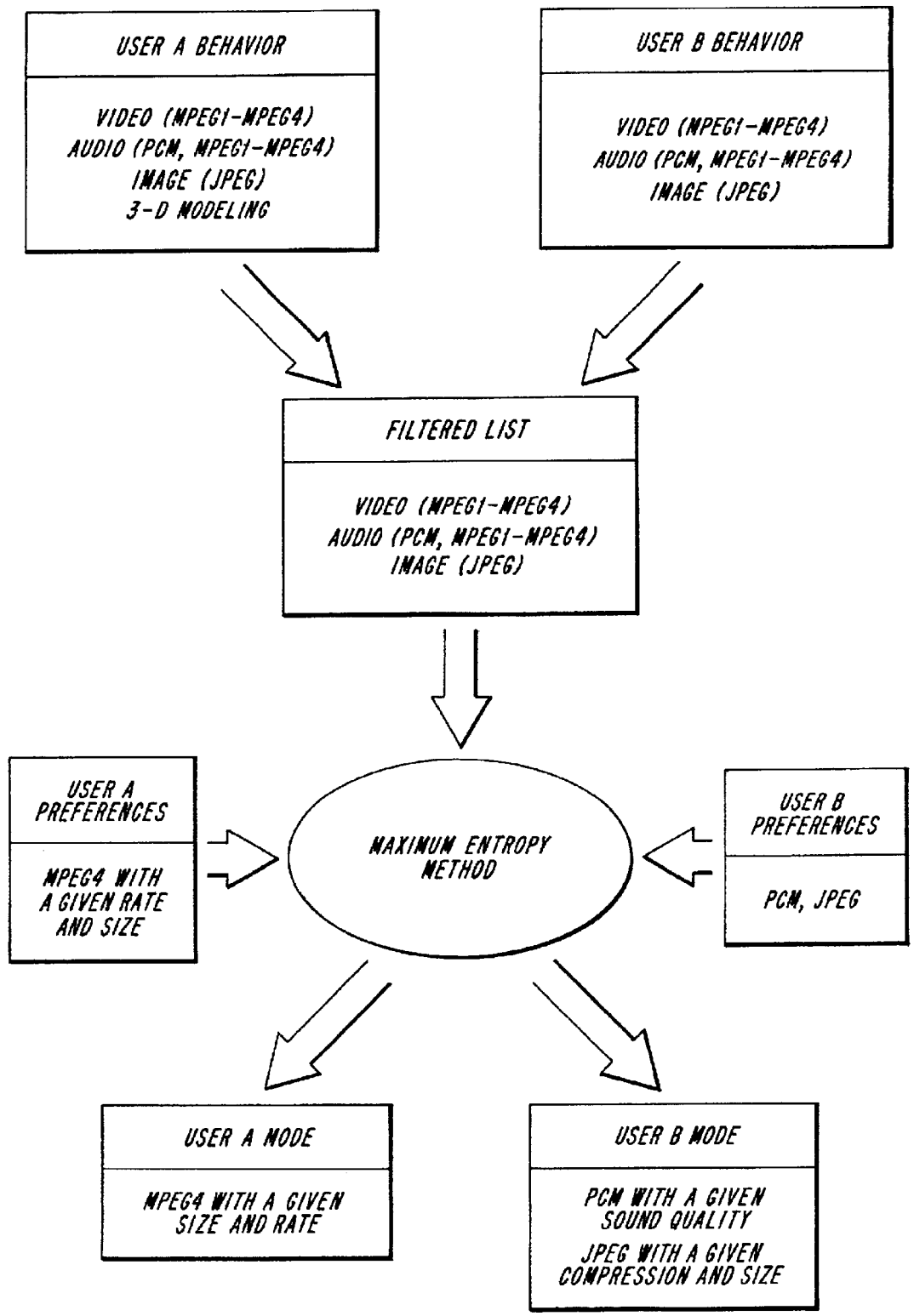
FIG. 4 illustrates the establishment of a channel mode between two users in accordance with exemplary embodiments of the present invention.

FIG. 4 illustrates an exemplary network including two users in accordance with the present invention. Assume that user A is a terminal with a large amount of processing power and has a large bandwidth connection to the network and user B is a terminal with a small amount of processing power and a low bandwidth connection to the network. As discussed above, at the initiation of the communication session, user A and user B exchange information regarding their own behavior. Assume that user A's behavior includes video formats MPEG 1–MPEG 4, audio formats pulse code modulation (PCM) and MPEG 1–MPEG 4, image format JPEG and 3-D modeling support and user A has a preference for MPEG 4 video and audio format. Further assume that user B's behavior includes support for video formats MPEG 1–MPEG 4, audio formats PCM and MPEG 1–MPEG 4, and image format JPEG and user B has a preference for PCM and JPEG. Accordingly, the behavior lists of users A and B are filtered to include only those behaviors which the users have in common. For users A and B this is video formats MPEG 1–MPEG 4, audio formats PCM and MPEG 1–MPEG 4, and image format JPEG.

Using the filtered list, the user preferences are taken into consideration. This results for user A in a list of combinations of different formats (qualities) of MPEG 4 for sound and video, and for user B in a list of combinations of different formats of JPEG and PCM. The resulting lists must be further scrutinized for an optimal behavior. First, each media format's entropy is calculated. For each different combination, the entropies of its components must be added to produce its total entropy value. The combination with the largest associated total entropy value is chosen as the optimal behavior. Accordingly, user A will appear to user B in a MPEG 4 image and audio format (with optimal combination of video and audio qualities) and user B will appear to user A as a JPEG image along with associated PCM audio (with optimal combinations of image and audio qualities). It will be recognized that the user preference needed is not be explicitly set by a user. For example, a computer vision feature tracking algorithm in user B's terminal may determine that user B is not facing the monitor of user B's terminal. Detecting that user B is not facing the monitor, the computer vision feature tacking system can set user B's preference to audio since video information will not provide user B with any information because user B is not facing the monitor.

Although the present invention has been described above as establishing channel modes at the initiation of a communication session, it will be recognized that due to changes in the communication environment, it may be desirable to reevaluate the established channel modes during a communication session. For example, in third generation (3G) wireless networks, the bandwidth can vary between 384 Kbits/s to 2 Mbits/s. A user that is changing his location may become eligible for more bandwidth, and in turn, may be able to receive more types of multimedia content, or "richer" multimedia content. Accordingly, the channel mode may be reestablished when a user moves into a location which supports a higher bandwidth connection.

Although the present invention has been primarily described above as establishing channel modes when a communication session is established between two users, it will be recognized that the present invention is equally applicable for establishing channel modes for communication sessions between more than two users. In addition, the present invention can be implemented such that additional users can join an existing communication session. When a new user wishes to join an existing communication session, the users of the existing communication session have three possible choices as to how to allow the new user to join the communication session.

First, the users of the existing communication session can accept the new user and all users must reestablish their channel mode based upon behaviors common between all users. For example, if the existing communication session employed live video for communication and the new user does not support live video, the existing users would not be able to continue to communicate using live video.

If the existing users do not want to give up their "rich" communication, but still wish for the new user to join, the new user can maintain passive communication with one or more of the existing users. In this situation, bandwidth and processing cycles remaining after the existing users communicate will be used to support communication with the new user. Negotiation can then take place between each of the existing users and the new user. The final alternative is that the existing users can reject the new user.

In the embodiments of the present invention the object is to establish some method for relating the concepts one wishes to express with the media available. The proposed method is a more "humanistic" approach to scaling media than the piece-wise, or per media, approach traditionally accepted. It should be noted that the described scheme does not contrast from traditional compression methods but employs those results to enhance communication. The effects of entropy related in specific media help to compare the different media and thus, provide a better communication solution for the end user.

The invention has been described herein with reference to particular embodiments. However, it will be readily apparent to those skilled in the art that it may be possible to embody the invention in specific forms other than those described above. This may be done without departing from the spirit of the invention. Embodiments described above are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for communicating information, comprising the steps of:
    determining the ability of a first and second terminal to reproduce information in a plurality of media formats;
    producing a list of media formats which can be reproduced by both the first and second terminals;
    utilizing the list of media formats, the performance of the first terminal, and the bandwidth of the first terminal's connection to the second terminal to establish a first channel mode for the first terminal to communicate information to the second terminal, wherein the first channel mode is established based upon one or more media which provide a user of the first terminal with a greatest level of understanding of the information to be transmitted, and wherein the greatest level of understanding of the information to be transmitted is determined by determining the media or combination of media which has the largest entropy per second taking into account the performance of the first terminal and the bandwidth of the first terminal's connection to the second terminal;
    utilizing the list of media formats, the performance of the second terminal, and the bandwidth of the second terminal's connection to the first terminal to establish a second channel mode for the second terminal to communicate information to the first terminal; and
    communicating between the first and second terminal in accordance with their respective channel modes.

2. A method for communicating information comprising the steps of:
    determining the ability of a first and second terminal to reproduce information in a plurality of media formats;
    producing a list of media formats which can be reproduced by the first and second terminals;
    determining one or more media which provide a user of the first terminal with a greatest level of understanding of the information to be transmitted, wherein the one or more media are determined based upon user conditions;
    utilizing the list of media formats, the performance of the first terminal, and the bandwidth of the first terminal's connection to the second terminal to establish a first channel mode for the first terminal to communicate information to the second terminal, wherein the first channel mode is established based upon one or more media which provide a user of the first terminal with a greatest level of understanding of the information to be transmitted, wherein the one or more media are determined based upon user conditions, and the user conditions are determined using face finding and position tracking, whereby it can be determined whether a user is looking at a screen associated with a terminal;
    utilizing the list of media formats, the performance of the second terminal, and the bandwidth of the second terminal's connection to the first terminal to establish a second channel mode for the second terminal to communicate information to the first terminal; and
    communicating between the first and second terminal in accordance with their respective channel modes.

3. An apparatus for communicating information, comprising:
    means for determining the ability of a first and second terminal to reproduce information in a plurality of media formats;
    means for producing a list of media formats which can be reproduced by the first and second terminals;
    means for utilizing the list of media formats, the performance of the first terminal, and the bandwidth of the first terminal's connection to the second terminal to establish a first channel mode for the first terminal to communicate information to the second terminal, wherein the first channel mode is established based upon one or more media which provide a user of the first terminal with a greatest level of understanding of the information to be transmitted, and wherein the greatest level of understanding of the information to be transmitted is determined by determining the media or combination of media which has the largest entropy per second taking into account the performance of the first terminal and the bandwidth of the first terminal's connection to the second terminal;
    means for utilizing the list of media formats, the performance of the second terminal, and the bandwidth of the second terminal's connection to the first terminal to establish a second channel mode for the second terminal to communicate information to the first terminal; and
    means for communicating between the first and second terminal in accordance with their respective channel modes.

4. An apparatus for communicating information, comprising:

means for determining the ability of a first and second terminal to reproduce information in a plurality of media formats;

means for producing a list of media formats which can be reproduced by the first and second terminals;

means for utilizing the list of media formats, the performance of the first terminal, and the bandwidth of the first terminal's connection to the second terminal to establish a first channel mode for the first terminal to communicate information to the second terminal, wherein the first channel mode is established based upon one or more media which provide a user of the first terminal with a greatest level of understanding of the information to be transmitted, wherein the one or more media are determined based upon user conditions, and the user conditions are determined using face finding and position tracking, whereby it can be determined whether a user is looking at a screen associated with a terminal;

means for utilizing the list of media formats, the performance of the second terminal, and the bandwidth of the second terminal's connection to the first terminal to establish a second channel mode for the second terminal to communicate information to the first terminal; and means for communicating between the first and second terminal in accordance with their respective channel modes.

* * * * *

UNITED STATES PATENT AND TRADEMARK OFFICE
CERTIFICATE OF CORRECTION

PATENT NO. : 6,928,087 B2  Page 1 of 1
APPLICATION NO. : 09/768602
DATED : August 9, 2005
INVENTOR(S) : Slowe et al.

It is certified that error appears in the above-identified patent and that said Letters Patent is hereby corrected as shown below:

On the Title Page, in item (75), under "Inventors", in Column 1, Line 1, delete "Stockholm (SE)" and insert -- Middleburg, VA --, therefor.

In Column 5, Line 42, in Equation 3, delete "$H'_3D\_{Model}$" and insert -- $H'_{3D\_Model}$ --, therefor.

Signed and Sealed this

Twenty-third Day of December, 2008

JON W. DUDAS
*Director of the United States Patent and Trademark Office*